(12) United States Patent
Farmer (10) Patent No.: US 7,747,258 B2
(45) Date of Patent: Jun. 29, 2010

(54) METHOD AND APPARATUS FOR PERFORMING POSITION DETERMINATION WITH PRE-SESSION ACTION

(75) Inventor: Dominic Gerard Farmer, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/050,575

(22) Filed: Feb. 4, 2005

(65) Prior Publication Data

US 2006/0178154 A1 Aug. 10, 2006

(51) Int. Cl.
*H04W 24/00* (2009.01)
*G01C 21/00* (2006.01)
*H04H 20/71* (2008.01)

(52) U.S. Cl. .............. 455/456.1; 455/456.2; 455/456.3; 455/3.02; 701/213; 701/214

(58) Field of Classification Search .............. 455/456.1, 455/456.2, 456.3, 456.4, 456.5, 456.6, 3.02; 701/213, 214, 215
See application file for complete search history.

(56) References Cited

U.S. PATENT DOCUMENTS

| | | | |
|---|---|---|---|
| 6,397,074 B1 | 5/2002 | Pihl et al. | |
| 6,466,788 B1 * | 10/2002 | Carlsson | 455/435.2 |
| 6,985,742 B1 * | 1/2006 | Giniger et al. | 455/456.1 |
| 2002/0111171 A1 * | 8/2002 | Boesch et al. | 455/456 |
| 2004/0002814 A1 * | 1/2004 | Gogic | 701/214 |
| 2005/0192024 A1 * | 9/2005 | Sheynblat | 455/456.1 |
| 2005/0250519 A1 * | 11/2005 | Samuel | 455/457 |

FOREIGN PATENT DOCUMENTS

| | | |
|---|---|---|
| EP | 1298448 A1 | 4/2003 |
| WO | 03/034765 A1 | 4/2003 |

OTHER PUBLICATIONS

"3rd Generation Partnership Project: Technical Specification Group Services and System Aspects; Functional Stage 2 Description of LCS (Release 6); 3GPP TS 23.271" ETSI Standards, European Telecommunications Standards Institute, Sep. 2003, V6.5.0, Sophia-Antipo, France. Please note: Document submitted in 2 parts. Part 1 (50 pages), Part 2 (50 pages).

(Continued)

*Primary Examiner*—Nick Corsaro
*Assistant Examiner*—Shannon R Brooks
(74) *Attorney, Agent, or Firm*—Jimmy Cheng (57) ABSTRACT

A network sends to a user equipment (UE) an indication (e.g., a request for permission) to perform a position fix for the UE. The network also selectively sends to the UE a pre-session command for an action related to position determination. For example, the command may direct the UE to (1) clear all or a portion of location-related data at the UE prior to performing the position fix, (2) send back a position estimate for the UE, if available, or (3) apply a time offset and/or a position offset in performing the position fix. The UE sends to the network an acknowledgment (e.g., a grant of permission) to perform the position fix. The UE also performs the action indicated by the command (if any) received from the network prior to or in conjunction with performing the position fix. The network and UE perform the position fix for the UE.

26 Claims, 5 Drawing Sheets

OTHER PUBLICATIONS

International Search Report- PCT/US2006/006992- International Search Authority/EPO, Jun. 29, 2006 (2 pages).

Written Opinion, PCT/US06/006992, ISA/EPO, Jun. 29, 2006.

International Preliminary Report on Patentability, PCT/US06/006992, The International Bureau OPF—WIPO, Geneva, Switzerland, Aug. 7, 2007.

* cited by examiner

METHOD AND APPARATUS FOR PERFORMING POSITION DETERMINATION WITH PRE-SESSION ACTION

BACKGROUND

I. Field

The present invention relates generally to communication, and more specifically to a method and apparatus for performing position determination.

II. Background

It is often desirable, and sometimes necessary, to know the position of a wireless device in a network. For example, a wireless user may utilize the wireless device to browse through a website and may click on location sensitive content. The web server would then query the network for the position of the wireless device. The network would initiate location processing with the wireless device in order to perform a position fix and ascertain the position of the wireless device. The network would then return a position estimate for the wireless device to the web server, which uses this position estimate to provide appropriate content to the wireless user. There are many other scenarios in which location information is useful or necessary. In the following description, the terms "location" and "position" are synonymous and are used interchangeably.

To perform a position fix, the wireless device makes measurements for satellites and/or base stations that are observable by the wireless device. The wireless device typically makes measurements for satellites in accordance with a predetermined procedure and using assistance data that can narrow the search for observable satellites. In certain scenarios, it is desirable to reset the wireless device to a known state prior to performing the position fix, as described below.

There is therefore a need in the art for a method and apparatus to flexibly perform position determination.

SUMMARY

A method and apparatus for flexibly performing position determination for a wireless device, which is also called a user equipment (UE), is described herein. In one embodiment of the method and apparatus, a network sends to the UE an indication (e.g., a request for permission) to perform a position fix for the UE. The network also selectively (or optionally) sends to the UE a pre-session command for an action related to position determination, typically along with the indication. For example, the command may direct the UE to (1) clear all or a portion of location-related data at the UE prior to performing the position fix, (2) send back a position estimate for the UE, if available, or (3) apply a time offset and/or a position offset in performing the position fix. The UE sends to the network an acknowledgment (e.g., a grant of permission) to perform the position fix. The UE also performs the action indicated by the command (if any) received from the network prior to or in conjunction with performing the position fix. This action can reset the UE to a known state, which may be desirable for various scenarios. The network and UE then perform the position fix for the UE.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
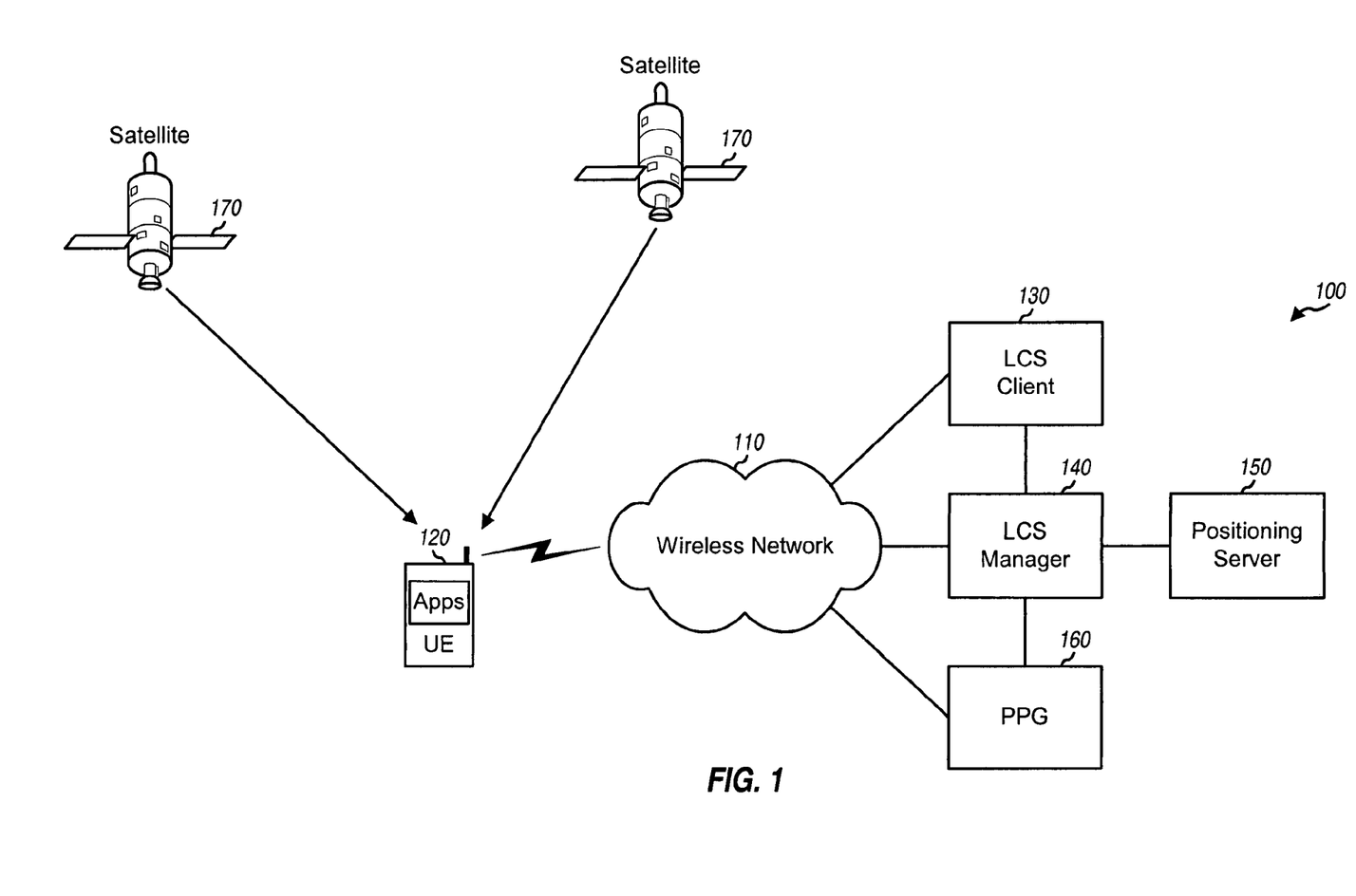
FIG. 1 shows a diagram of a network capable of performing position determination.

FIG. 1 shows a diagram of a network 100 that can perform position determination. Network 100 includes a wireless network 110 that provides wireless communication for wireless devices located throughout the coverage area of the wireless network. For simplicity, only one wireless device 120 is shown in FIG. 1. A wireless device may be fixed or mobile and may also be called a user equipment (UE), a mobile station, a terminal, a subscriber unit, or some other terminology.

Wireless network 110 may be a Code Division Multiple Access (CDMA) network, a Time Division Multiple Access (TDMA) network, a Frequency Division Multiple Access (FDMA) network, an Orthogonal Frequency Division Multiple Access (OFDMA) network, or some other multiple access network. A CDMA network may implement one or more CDMA radio access technologies (RATs) such as Wideband-CDMA (W-CDMA) and cdma2000. cdma2000 covers IS-2000, IS-856, and IS-95 standards. A TDMA network may implement one or more TDMA RATs such as Global System for Mobile Communications (GSM). These various RATs and standards are well known in the art. W-CDMA and GSM are described in documents from a consortium named "3rd Generation Partnership Project" (3GPP) and are parts of Universal Mobile Telecommunication System (UMTS). cdma2000 is described in documents from a consortium named "3rd Generation Partnership Project 2" (3GPP2). 3GPP and 3GPP2 documents are publicly available. For clarity, certain aspects are specifically described below for UMTS. Wireless device 120 is called UE 120 (3GPP terminology) in the following description.

In network 100, a location services (LCS) client 130 is a function or an entity that requests location information for LCS targets. An LCS target is a UE whose position is being sought. In general, an LCS client may reside in a network entity or a UE. An LCS manager 140 communicates with wireless network 110, LCS client 130, a positioning server 150, and a Push Proxy Gateway (PPG) 160. LCS manager 140 provides various services such as subscriber privacy, authorization, authentication, billing, and so on. Positioning server 150 provides position determination services and supports UE-based and UE-assisted positioning modes. In the UE-based positioning mode, the position of a UE is determined by the UE, possibly with assistance data from positioning server 150. In the UE-assisted positioning mode, the position of a UE is determined by positioning server 150 with assistance (e.g., measurements) from the UE. PPG 160 is a network entity that creates a standard Application Programming Interface (API) for pushing content via a network and performs adaptation for different air interfaces.

For simplicity, FIG. 1 mainly shows network entities that are pertinent for position determination. These network entities may also be referred to by other names. For example, LCS manager 140 may also called be an LCS server, a location server, a mobile positioning center (MPC), a gateway mobile location center (GMLC), and so on. Positioning server 150 may also be called a position determination entity (PDE), a serving mobile location center (SMLC), and so on. In general, a network may include any collection of network entities that can provide any range of services.

FIG. 1 shows a specific architecture for network 100. In this architecture, UE 120 and positioning server 150 exchange messages via LCS manager 140, which acts as a proxy for these two entities. Positioning server 150 may communicate with LCS manager 140 using one interface (e.g., an LIp interface) and may communicate with UE 120 via LCS manager 140 using another interface (e.g., an Lup interface). Other architectures with other interfaces between the various network entities may also be used for network 100.

Network 100 may utilize a user plane or a control plane to support position determination. A user plane is a mechanism for carrying data for higher-layer applications and employs a user-plane bearer, which is typically implemented with various protocols such as User Datagram Protocol (UDP), Transmission Control Protocol (TCP), and Internet Protocol (IP), all of which are well known in the art. A control plane (which is also commonly called a signaling plane) is another mechanism for carrying data for higher-layer applications and may be implemented with network-specific protocols and signaling messages.

UE 120 may also receive signal from various satellites, such as satellites 170 in a Global Positioning System (GPS). GPS is a constellation of 24 active and some spare satellites that circle the earth in well-spaced orbits. UE 120 may measure signals from GPS satellites and obtain pseudo-range measurements for these satellites. These measurements may be used to compute a precise position estimate for the UE.

The position of UE 120 may be requested by (1) applications (Apps) running at the UE, which results in UE-initiated position determination, and (2) applications running at LCS client 130, which results in network-initiated position determination. In general, network-initiated and UE-initiated position determination may be triggered by various entities, applications, and events. For clarity, some exemplary call flows for network-initiated and UE-initiated position determination are described below.

Figure 2:
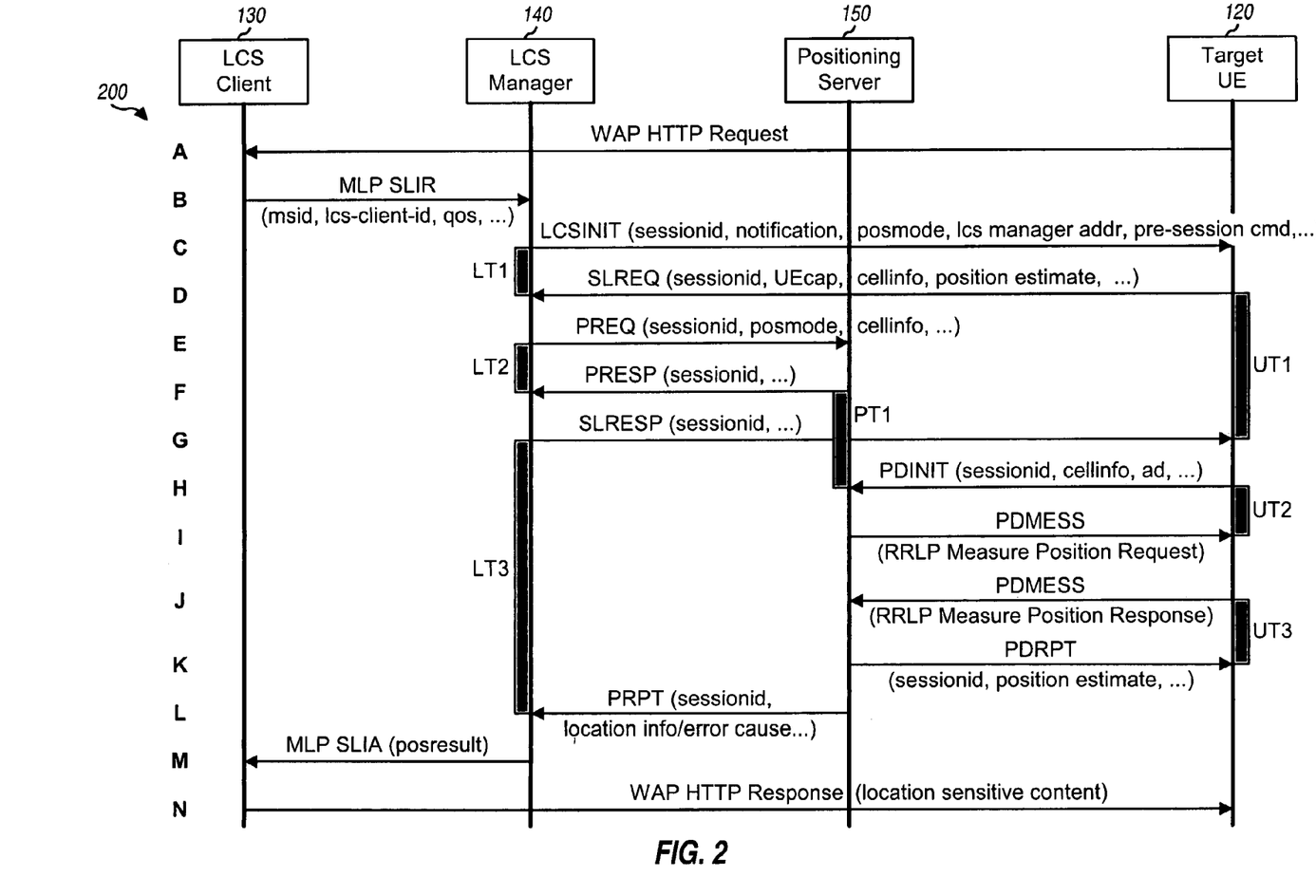
FIGS. 2 and 3 show call flows for network-initiated position determination and UE-initiated position determination, respectively, in a network with a user plane.

FIG. 2 shows an exemplary call flow 200 for network-initiated position determination in network 100 with a user plane. For call flow 200, UE 120 is a target UE whose position is being sought. Positioning server 150 serves the geographic area associated with the target UE 120.

A wireless user at UE 120 executes a Wireless Application Protocol (WAP) application (or some other browser application), browses a website, and requests location sensitive content by sending a WAP Hyper Text Transfer Protocol (HTTP) Request to LCS client 130 via wireless network 110 (step A). Step A may or may not be present for network-initiated position determination. In general, position determination may be initiated on the network side by various entities and/or in response to various events.

LCS client 130 receives the WAP HTTP Request and determines that the position of UE 120 is needed in order to provide the appropriate content. LCS client 130 then sends a Mobile Location Protocol (MLP) Location Immediate Request (SLIR) message to LCS manager 140 to request for a position fix for UE 120 (step B). MLP is one signaling protocol that may be used for the communication between LCS client 130 and LCS manager 140, and other signaling protocols may also be used for this interface. The MLP SLIR message may contain, for example, an identifier for UE 120 (msid), an identifier for LCS client 130 (lcs-client-id), a location quality of service (qos), and so on. The qos indicates the required accuracy for the position fix for the target UE.

LCS manager 140 receives the MLP SLIR message, authenticates LCS client 130 based on the lcs-client-id, and determines if LCS client 130 is authorized for the requested service (also step B). LCS manager 140 may perform a subscriber privacy check to determine whether a position fix is permitted for the UE (also step B). This check may be performed based on (1) the lcs-client-id, msid, qos, and so on, included in the received MLP SLIR message and (2) a profile or a subscription for a subscriber, which is typically the wireless user at the UE. If the subscriber privacy check passes, then the remaining steps for call flow 200 continue as described below. Otherwise, if the subscriber privacy check fails, then LCS manager 140 does not authorize LCS client 130 for the requested service, call flow 200 terminates early and jumps to step M, and LCS manager 140 returns an applicable MLP return code.

If all of the applicable checks pass in step B, then LCS manager 140 initiates location processing with UE 120 by sending an LCSINIT message to the UE (step C). The LCSINIT message may contain, for example, a session identifier (sessionid), a notification, a positioning mode (posmode), an address for LCS manager 140 (lcs manager address), and so on. The session identifier is used to unambiguously identify the communication between the network and the UE for the location request. The notification indicates whether to perform (1) notification to inform the wireless user of the location request and (2) verification to obtain consent from the wireless user for the location request. The notification parameter typically includes some pertinent text for notification. The positioning mode indicates which mode to use for position determination, e.g., UE-based or UE-assisted positioning mode. The LCSINIT message may optionally include a pre-session command that directs the UE to perform a particular action related to position determination. For example, the pre-session command may direct the UE to (1) clear all or a portion of the location-related data stored at the UE, (2) send a position estimate for the UE, if available, back to LCS manager 140, (3) apply a position and/or time offset in computing a new position estimate for the UE, and so on. The LCSINIT message is implemented as a WAP PUSH trigger to start the location processing. The location processing includes appropriate signaling exchanges and processing to obtain location information for the target UE. LCS manager 140 starts a timer LT1 upon sending the LCSINIT message (also step C). The LT1 timer is used to timeout the location processing if a response is not received from UE 120 prior to expiration of the timer.

UE 120 receives the LCSINIT message from LCS manager 140. If a pre-session command is received in the LCSINIT message, then UE 120 performs the action indicated by the command, e.g., upon receiving the LCSINIT message or at a later time. If notification or verification is required, as indicated by the notification parameter in the LCSINIT message, then UE 120 provides popup text or some other display to notify the wireless user of the entity requesting location information for the UE. If verification is required, then the wireless user is queried to either grant or deny the location request.

If the wireless user grants the location request, then UE 120 prepares for location processing by retrieving various types of information that are pertinent for position determination such as, for example, the current cell information (cellinfo) and the UE capabilities (UEcap). The cell information may be used to provide appropriate assistance data for the UE. The UE capabilities may be used to determine which positioning mode to use to perform a position fix for the UE. UE 120 then sends a Start Location Request (SLREQ) message to LCS manager 140 to initiate a location session with the LCS manager (step D). This SLREQ message may contain, for example, the sessionid, the cell information, the selected positioning mode, the UE capabilities, and so on. The SLREQ message optionally includes a position estimate for UE 120, e.g., if this position estimate is available and meets all criteria (if any) imposed by the network and/or the UE. UE 120 may have obtained this position estimate, for example, by performing a position fix for a prior location request, which may have been initiated by the network or the UE. UE 120 starts a timer UT1 upon sending the SLREQ message (also step D). This timer is used to timeout the location processing if a response is not received from LCS manager 140 prior to expiration of the timer.

If the wireless user denies the location request, then UE 120 sends a Start Location Reject (SLREJ) message to LCS manager 140 (not shown in FIG. 2A). The SLREJ message may contain a denial indication and/or other parameters. The SLREJ message ends the communication between UE 120 and LCS manager 140 for this location request. The description below assumes that UE 120 sends an SLREQ message.

LCS manager 140 receives the SLREQ message from UE 120 and stops the LT1 timer upon receiving this message (also step D). LCS manager 140 extracts the parameters included in the received SLREQ message. If the position estimate for UE 120 is included in the SLREQ message and LCS manager 140 decides to use this position estimate, then call flow 200 performs step G and then proceeds to step M. Otherwise, LCS manager 140 initiates location processing for UE 120 by sending a Position Request (PREQ) message to positioning server 150 (step E). This PREQ message may contain, for example, the sessionid, the posmode, the cellinfo, and so on. LCS manager 140 starts a timer LT2 upon sending the PREQ message (also step E). The LT2 timer is used to timeout the communication with positioning server 150 if a response is not received from the positioning server prior to expiration of the timer.

Positioning server 150 receives the PREQ message from LCS manager 140 and sends back a Position Response (PRESP) message (step F). The PRESP message may contain, for example, the sessionid. The PRESP message confirms to LCS manager 140 that positioning server 150 is ready to process the location request identified by the sessionid. Positioning server 150 starts a timer PT1 upon sending the PRESP message (also step F). The PT1 timer is used to timeout the position determination for this sessionid if a message is not received from target UE 120 prior to expiration of the timer.

LCS manager 140 receives the PRESP message from positioning server 150 and stops the LT2 timer (also step F). LCS manager 140 then sends a Start Location Response (SLRESP) message to UE 120 to initiate a positioning procedure (step G). The positioning procedure includes appropriate signaling exchanges and pertinent processing to obtain a position estimate for the target UE. The SLRESP message may contain, for example, the sessionid and possibly other information (e.g., a pre-session command to direct UE 120 to perform certain action related to position determination, if this command was not sent in step C). The SLRESP message informs UE 120 that positioning server 150 is ready to perform a position fix for the UE. LCS manager 140 starts a timer LT3 upon sending the SLRESP message (also step G). The LT3 timer is used to timeout the communication with positioning server 150 if a response is not received from the positioning server prior to expiration of this timer.

UE 120 receives the SLRESP message from LCS manager 140 and stops the UT1 timer (also step G). UE 120 then starts the positioning procedure by sending a Position Determination Initiation (PDINIT) message to LCS manager 140, which forwards the message to positioning server 150 (step H). This PDINIT message may contain, for example, the sessionid, the cellinfo (e.g., the identifier of the cell in which UE 120 is located), request for assistance data (ad), a coarse position estimate for the UE, and so on. UE 120 starts a timer UT2 upon sending the PDINIT message (also step H). The UT2 timer is used to timeout the communication with positioning server 150 if a response is not received from the positioning server prior to expiration of this timer.

Positioning server 150 receives the PDINIT message from UE 120 and stops the PT1 timer (also step H). Positioning server 150 may then start a precise position determination procedure by sending a Position Determination Messaging (PDMESS) message that contains a Radio Resource LCS Protocol (RRLP) Measure Position Request message (step I). RRLP is one of multiple assisted Global Positioning System (A-GPS) protocols that are available to perform a position fix with measurements for GPS satellites. The RRLP Measure Position Request message may contain, for example, a request for a position fix, assistance data, and possibly other information, e.g., a pre-session command to direct UE 120 to perform certain action related to position determination.

UE 120 receives the PDMESS message from positioning server 150 and stops the UT2 timer (also step I). If UE 120 has cleared GPS assistance data stored at the UE, as directed by a pre-session command received from the network, then UE 120 may request for new assistance data from the network or may obtain new assistance data directly from GPS satellites. For example, UE 120 may send to positioning server 150 an RRLP Measure Position Response message containing an error code and a request for assistance data (not shown in FIG. 2). Positioning server 150 may then send another RRLP Measure Position Request message containing the assistance data requested by UE 120 (also not shown in FIG. 2).

After obtaining all of the pertinent assistance data (if any), UE 120 performs measurements appropriate for the selected positioning mode. For example, UE 120 may obtain (1) pseudo-range and/or time measurements for GPS satellites for an A-GPS position fix, (2) pseudo-range and/or time measurements for base stations for a terrestrial position fix, (3) measurements for both satellites and base stations for a hybrid position fix, (4) cell identifiers for a cell-ID based position fix, and so on. The measurements for GPS satellites are made with the assistance data available at UE 120, which may have just been downloaded from the network or GPS satellites. For the UE-based positioning mode, UE 120 further computes a position estimate based on the measurements. UE 120 then sends a PDMESS message that contains an RRLP Measure Position Response message to LCS manager 140, which forwards the message to positioning server 150 (step J). The RRLP Measure Position Response message may contain the measurements made by the UE, the position estimate computed by the UE, and/or request for more assistance data. For the UE-assisted positioning mode, UE 120 starts a timer UT3 upon sending the PDMESS message (also step J). The UT3 timer is used to timeout the communication with positioning server 150 if a response is not received from the positioning server prior to expiration of this timer.

Positioning server 150 receives the PDMESS message from UE 120 (also step J). For the UE-based positioning mode, positioning server 150 uses the position estimate included in the received RRLP Measure Position Response message. For the UE-assisted positioning mode, positioning server 150 computes a position estimate for UE 120 based on the measurements included in the RRLP Measure Position Response message. For the UE-assisted positioning mode, positioning server 150 sends a Position Determination Report (PDRPT) message to UE 120 (step K). Positioning server 150 does not send a PDRPT message to UE 120 for the UE-based positioning mode. Positioning server 150 also sends a Position Report (PRPT) message to LCS manager 140 (step L). This PRPT message may contain, for example, the sessionid, location information for UE 120, error code/cause (if applicable), and so on.

LCS manager 140 receives the PRPT message from positioning server 150 and stops the LT3 timer (also step L). LCS manager 140 extracts the location information for UE 120 from the received PRPT message and sends an MLP Location Immediate Acknowledgment (SLIA) message to LCS client 130 (step M). This MLP SLIA message contains the requested position estimate for UE 120 (posresult) and possibly other pertinent information. LCS client 130 receives the MLP SLIA message and uses the position estimate for UE 120 to retrieve the location sensitive content requested by the wireless user. LCS client 130 then sends to UE 120 a WAP HTTP Response message containing this location sensitive content (step N). Steps A and N are present for a WAP call (e.g., to download location sensitive content) and may not be present for other instances of network-initiated position determination.

UE 120 may store various types of location-related data. The location-related data may include, for example, GPS assistance data, a position estimate for the UE, a cell-ID database, and so on. Table 1 lists some types of location-related data and their short description.

The GPS assistance data is used to narrow the search for GPS satellites and may include, for example, an almanac, an ephemeris, time information, ionospheric information, UTC, and so on. Each GPS satellite transmits an almanac that may be used to calculate the coarse positions of all active GPS satellites in the constellation. Each GPS satellite also transmits an ephemeris that may be used to calculate an accurate position of itself in the constellation. The timing of each GPS satellite, which is often referred to as GPS time, may be obtained from the signals transmitted by the satellite. Each GPS satellite also transmits its UTC time offset and ionospheric information.

UE 120 can make measurements for GPS satellites more quickly with the assistance data, which can narrow the search for observable satellites. UE 120 may obtain the assistance data from the network and/or download the data directly from the satellites. UE 120 typically stores the assistance data until it becomes stale, at which time the UE may request new assistance data from the network or download this data from the satellites.

UE 120 may already have a position estimate for itself when a location request is received from the network. This position estimate may have been obtained by performing a position fix for a prior location request. This position estimate may include, for example, a latitude, a longitude, an altitude (for a 3-D position estimate) for the estimated position of the UE, an uncertainty in the position estimate, and a confidence in the position estimate being within the uncertainty.

UE 120 may also store a cell-ID database that contains position estimates previously computed for the UE in different cells. The cell-ID database may be updated whenever a position fix is performed for the UE. The cell-ID database may be used to obtain an initial position estimate for the UE (e.g., when the UE is first powered on) or to limit the search range for satellites.

In certain scenarios, it is desirable to clear all or a portion of the location-related data stored at UE 120. For example, in order to perform UE performance testing, it may be desirable or necessary to clear all or certain portion of the location-related data at the UE and force the UE to obtain new location-related data. As another example, a recovery mechanism may be needed in order to force the UE to clear certain location-related data that is known to be bad, e.g., an almanac for a time period that is too far in the future.

TABLE 1

| Location-Related Data | Description |
| --- | --- |
| GPS Assistance Data | |
| Time Information | Include bit of week (BOW), epoch (in bit), and sub-code frame that provide the timing of a given GPS satellite. |
| Almanac | Include parameters for calculating the coarse positions and clock errors of all active GPS satellites. |
| Ephemeris | Include parameters for calculating an accurate position and clock error of a given GPS satellite. |
| Ionospheric Information | Includes parameters for an ionospheric model used to approximate propagation delay through the ionosphere at any given location and time. |
| UTC Time Offset | Difference between GPS time of a given GPS satellite and universal coordinated time (UTC). |
| Position Estimate | A position estimate previously computed for the UE and available at the UE. |
| Cell-ID Database | A database of prior positions of the UE as a function of cell ID. |

In an embodiment, the network may send a pre-session command to direct the UE to clear all or a portion of the location-related data stored at the UE. This pre-session command can reset the UE to a known state for position determination. For example, pre-session command may direct the UE to (1) clear all or some of the assistance data to force the UE to update its assistance data, (2) clear the current position estimate for the UE to force the UE to compute a new position estimate, or (3) clear the cell-ID database to purge old position history for the UE, e.g., if the UE has moved to a new city.

In another embodiment, the network may send a pre-session command to direct the UE to perform certain action prior to or in conjunction with performing a position fix for the UE. For example, the pre-session command may direct the UE to (1) apply a time offset to the UE's clock estimate in making pseudo-range measurements for GPS satellites or (2) apply a position offset to an initiate position estimate for the UE in computing a position estimate for the UE. The network may also send other pre-session commands to direct the UE to perform other actions prior to or in conjunction with performing a position fix for the UE.

In general, a pre-session command may be sent by various network entities (e.g., LCS manager 140 and/or positioning server 150 in network 100) and at various steps in a call flow for position determination (e.g., in step C, G, or I in call flow 200 in FIG. 2). A pre-session command may also be sent in various fields of messages sent by the network to the UE. In an embodiment, a pre-session command may selectively (or optionally) be sent in the sessionid. The sessionid is composed of various fields such as, for example, a Server-SessionID field and a UE-SessionID field. The Server-SessionID field contains the part of the session ID that is assigned by network 100 and is unique among all LCS managers and positioning servers in the network. The UE-SessionID field contains the part of the session ID that is assigned by UE 120.

For network-originated call flow 200 in FIG. 2, LCS manager 140 sets the Server-SessionID field of the sessionid to an assigned value and sets the UE-SessionID field to a selected value. LCS manager 140 includes the sessionid in the LCSINIT message sent to UE 120 in step C of call flow 200 in FIG. 2. UE 120 assigns a value to the UE session ID upon receiving the LCSINIT message. The sessionid is formed by the network-assigned value for the Server-SessionID field and the UE-assigned value for the UE-SessionID field. All subsequent messages should contain this sessionid.

In an embodiment, LCS manager 140 sets the UE-SessionID field to one of multiple possible values to indicate the desired action (if any) to be performed by UE 120. Table 2 lists various clear actions and the corresponding commands, for a specific embodiment. A value of 000000000b for the UE-SessionID field indicates a normal mode with no pre-session command being sent. Each of the other values for the UE-SessionID field is for a different pre-session command that corresponds to a specific action to be performed by the UE.

TABLE 2

| UE-SessionID | Description |
|---|---|
| 00000000b | Normal operation - retain all location-related data at the UE. |
| 00000001b | Clear time information. |
| 00000010b | Clear almanac. |
| 00000100b | Clear ephemeris. |
| 00001000b | Clear ionospheric information. |
| 00010000b | Clear UTC time offset. |
| 00100000b | Clear all GPS assistance data. |
| 01000000b | Clear position estimate. |
| 10000000b | Clear cell-ID database. |
| 11111111b | Clear all location-related data at the UE. |

For the embodiment shown in Table 2, the UE-SessionID field includes 8 bits and is set to all zeros for the normal mode. The UE-SessionID field is set to different values for different pre-session commands. Each pre-session command corresponds to a clear (or purge) of all or a portion of the location-related data at the UE prior to performing a position fix. For the embodiment shown in Table 2, each bit of the UE-SessionID field is mapped to a specific type of location-related data. Each type of location-related data may be cleared by setting the associated bit to '1'. For example, the almanac and ephemeris may be cleared by setting the UE-SessionID field to 00000110b. This encoding scheme allows the UE to quickly ascertain which type of location-related data to clear, if any, by examining each bit in the UE-SessionID field.

For simplicity, Table 2 only shows pre-session commands for clearing location-related data. Other pre-session commands for other actions (e.g., to apply an offset in performing a position fix) may also be encoded. In general, any encoding scheme may be used for any set of pre-session commands supported by the network.

The network may send a pre-session command in the UE-SessionID field of the sessionid, as described above. In general, the network may send a pre-session command in any designated field of any message.

Figure 3:
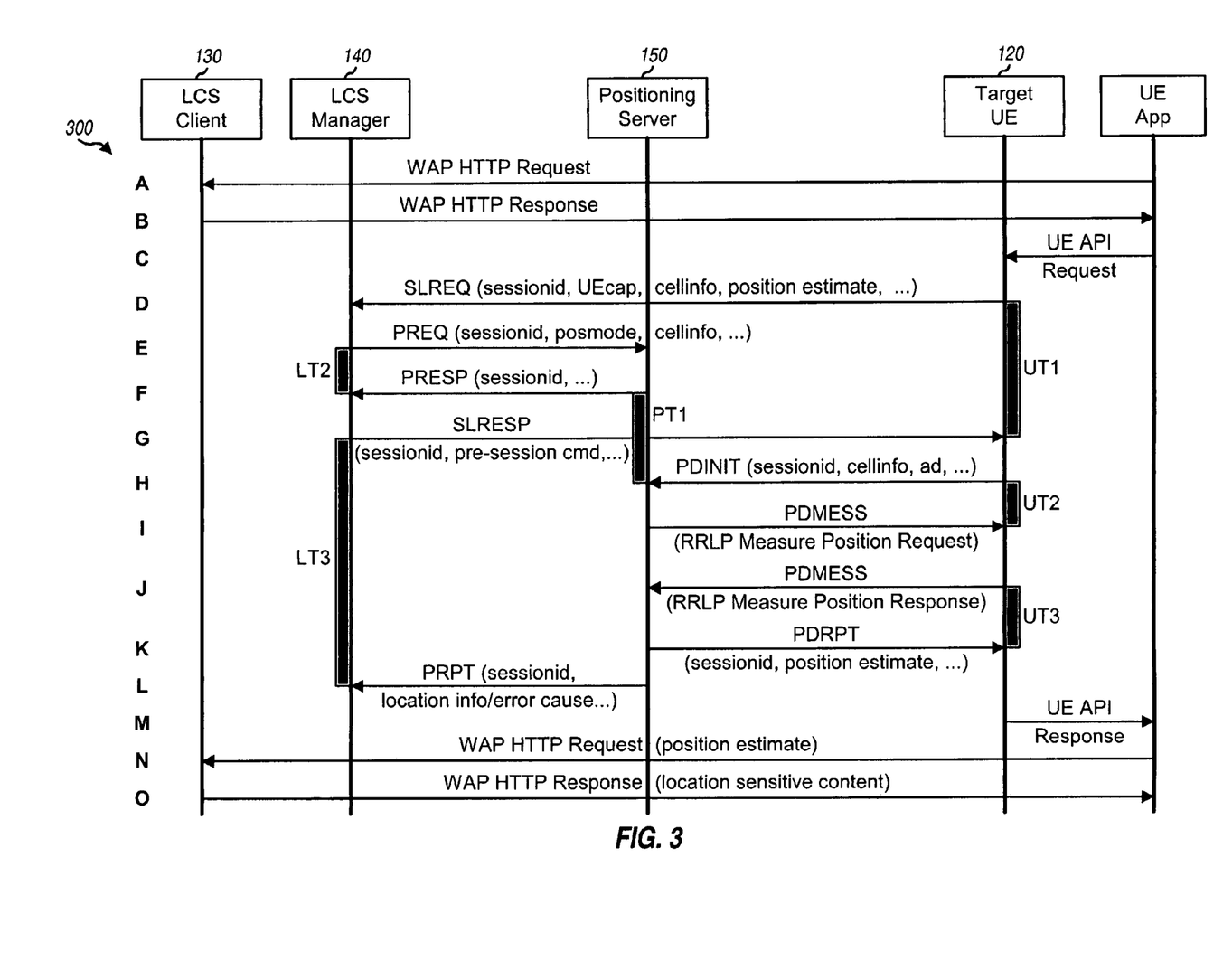

FIG. 3 shows an exemplary call flow 300 for UE-initiated position determination in network 100. For WAP applications, a WAP browser at UE 120 attempts to access location sensitive content at LCS client 130 (step A). LCS client 130 then sends an LCS trigger to the WAP browser at UE 120 (step B). An application (e.g., a web browser) resident at UE 120 invokes a local API and requests a position fix for the UE (step C).

If UE 120 is able to calculate the position fix locally without any interaction with the network, then call flow 300 proceeds to step M and the API call is returned immediately. Otherwise, if UE 120 needs network assistance to compute a position fix, then the UE initiates a location session with LCS manager 140 by sending an SLREQ message (step D). Steps D through L in call flow 300 generally correspond to steps D through L in call flow 200. LCS manager 140 may send a pre-session command in a SLRESP message in step G. Positioning server 150 may also send a pre-session command in an RRLP Measure Position Request message in step I. If a pre-session command is received, then UE 120 performs the action indicated by the received command prior to or in conjunction with performing the position fix. After performing the position fix, the UE API returns the position estimate to the application (step M). For WAP applications, the WAP browser at UE 120 re-requests the content and includes the position estimate in the request (step N). For WAP applications, LCS client 130 downloads the requested content (step O).

Figure 4:
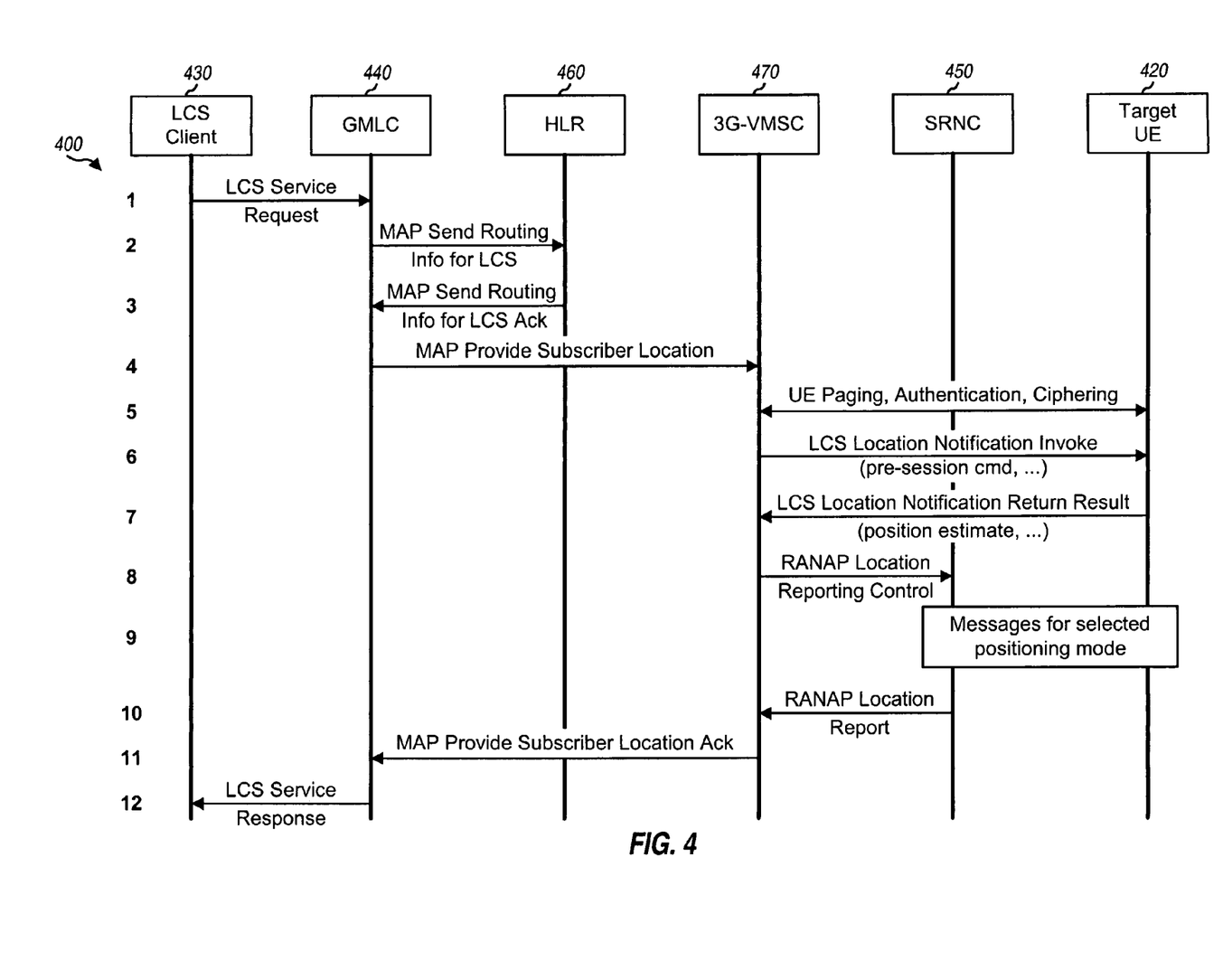
FIG. 4 shows a call flow for network-initiated position determination in a network with a control plane.

FIG. 4 shows another exemplary call flow 400 for network-initiated position determination in a UMTS or GSM network with a control plane. The UMTS/GSM network includes an LCS client 430 that is similar to LCS client 130 in network 100, a GMLC 440 that performs the functions of LCS manager 140, a serving radio network controller (SRNC) 450 that performs the functions of positioning server 150, a target UE 420 that is similar to UE 120, a home location register (HLR) 460 that stores registration information for UEs (including UE 420) that have registered with the wireless network covered by the HLR, and a third generation visitor mobile services switching centre (3G-VMSC) 470 that performs switching functions (e.g., routing of circuit-switch messages and data) for UEs within its coverage area.

For call flow 400, LCS client 430 requests the current position of target UE 420 from GMLC 440 (step 1). GMLC 440 verifies the identity of LCS client 430, authenticates the LCS client, and determines whether the LCS client is authorized for the requested LCS service. If LCS client 430 is authorized, then GMLC 440 derives an identifier of target UE 420 and determines the LCS QoS from either subscription data for the subscriber of UE 420 or data supplied by LCS client 430. The UE identifier may be a Mobile Subscriber ISDN (MSISDN), which is a dialable number, or an International Mobile Subscriber Identity (IMSI), which is a non-dialable number. GMLC 440 then sends to HLR 460 a Mobile Application Part (MAP) Send Routing Info for LCS message that contains the identifier of UE 420 (step 2).

HLR 460 verifies that GMLC 440 is authorized to request location information for UE 420. HLR 460 then returns to GMLC 440 a MAP Send Routing Info for LCS Ack message that contains the address of 3G-VMSC 470 and the identifier of UE 420 (step 3). If GMLC 440 already knows both the 3G-VMSC address and the UE identifier (e.g. from a previous location request), then steps 2 and 3 may be skipped.

GMLC 440 then sends a MAP Provide Subscriber Location message to 3G-VMSC 470 using the address provided by HLR 460 (step 4). This message contains the type of location information requested (e.g., the current position), the UE identifier, the LCS QoS (e.g., required accuracy and response time), an indication of whether LCS client 430 has override capability, and possibly other information.

3G-VMSC 470 may authenticate GMLC 440 and verify that the location request is allowed (also step 4). If the location request is allowed, then 3G-VMSC 470 may invoke the wireless network to perform paging, authentication and ciphering of UE 420 (step 5). UE 420 may provide its capabilities, e.g., the UE-based and/or UE-assisted positioning modes supported by the UE (also step 5).

3G-VMSC 470 sends an LCS Location Notification Invoke message to UE 420 (step 6). This message indicates the type of location request (e.g., the current position), the identity of LCS client 430, and whether privacy verification is required (step 6). This message may also include a pre-session command that indicates whether a particular action related to position determination is to be performed by the UE. UE 420 notifies the wireless user of the location request. If privacy verification was requested, then UE 420 queries the wireless user regarding the location request and waits for the user to grant or deny permission. UE 420 then sends an LCS Location Notification Return Result message to 3G-VMSC 470 (step 7). This message indicates whether permission is granted or denied and optionally includes a position estimate for UE 420. If permission is granted, then UE 420 performs the action indicated by the pre-session command (if any) received from the network.

3G-VMSC 470 sends a Radio Access Network Application Part (RANAP) Reporting Control message to SRNC 450 (step 8). This message contains the type of location information requested, the UE capabilities, and the LCS QoS. SRNC 450 selects an appropriate positioning mode to use based on the location request, the required accuracy, and the UE capabilities. SRNC 450 then initiates an appropriate message sequence for the selected positioning mode (step 9). For example, the message sequence may include steps H through K in FIG. 2 for an A-GPS positioning procedure. A message in the sequence may include a pre-session command (e.g., if one was not sent in step 6) to direct UE 420 to perform a desired action related to position determination. UE 420 performs the required measurements and reports either the measurements obtained by the UE or a position estimate computed by the UE based on the measurements. SRNC 450 receives the report from UE 420 and, for the UE-assisted positioning mode, computes a position estimate for the UE based on the received measurements. SRNC 450 then sends to 3G-VMSC 470 an RANAP Location Report message that contains the position estimate for UE 420 (step 10). 3G-VMSC 470 then sends to GMLC 440 a MAP Provide Subscriber Location Ack message that contains the position estimate for UE 420 and possibly other pertinent information (step 11). GMLC 440 then sends to LCS client 430 an LCS Service Response message that contains the position estimate for UE 420 (step 12).

Call flow 400 is described in detail in documents 3GPP TS 23.171 and 3GPP TS 23.271, both of which are publicly available.

For clarity, specific call flows with specific steps and messages have been described above in FIGS. 2 through 4. In general, call flows for network-initiated and UE-initiated position determination may include any number of steps, which may be different from the steps shown in FIGS. 2 through 4. Furthermore, the call flows may use any messages, which may be different from the messages shown in FIGS. 2 through 4. The network may issue a pre-session command in any message and at any step in a given call flow.

Figure 5:
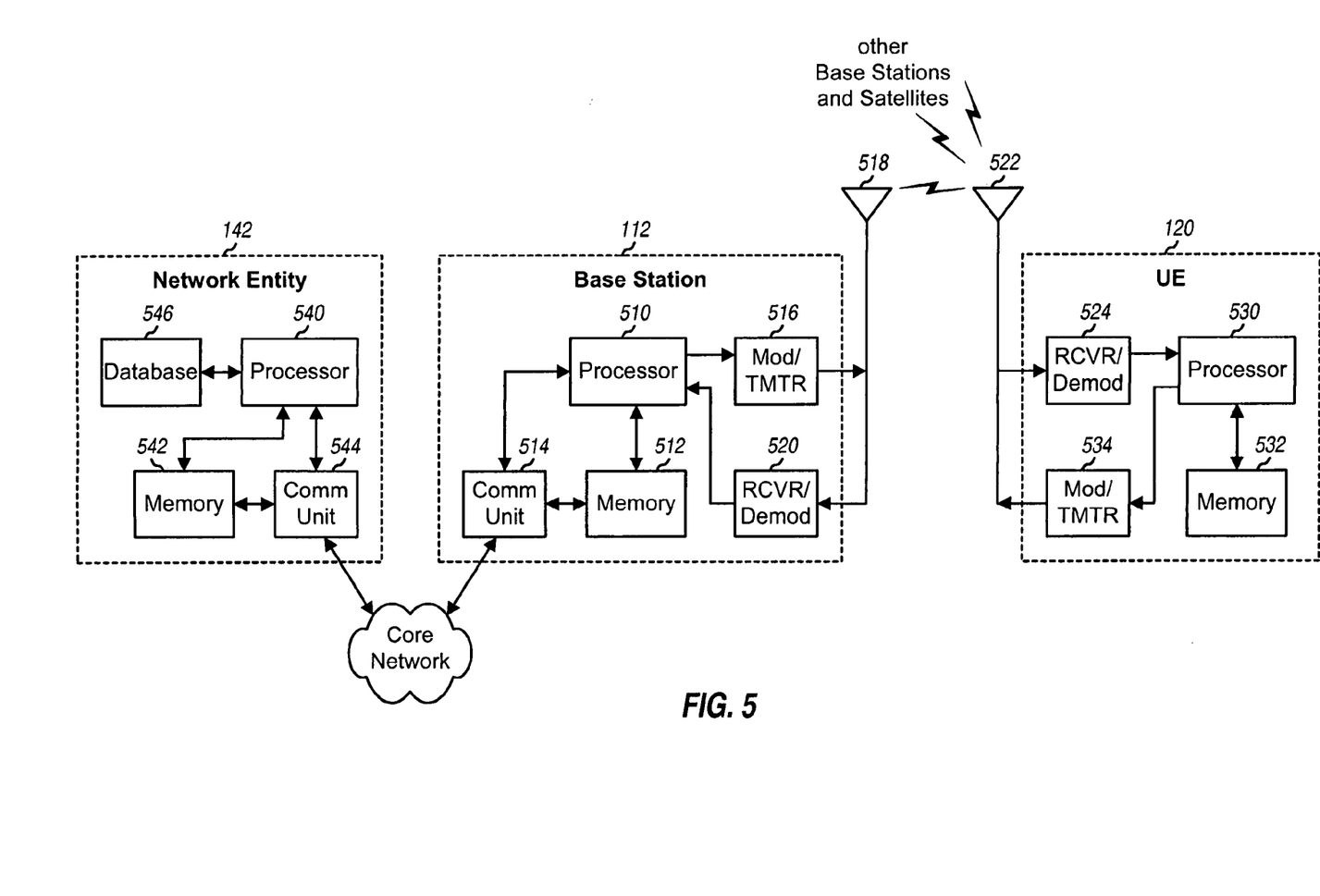
FIG. 5 shows a block diagram of various entities in the network in FIG. 1.

FIG. 5 shows a block diagram of various entities in network 100 in FIG. 1. UE 120 may be a cellular telephone, a user terminal, a computer with a wireless modem, a stand-alone position determination unit, or some other device. A base station 112 provides wireless communication for wireless network 110. For simplicity, only one network entity 142 is shown in FIG. 5. Network entity 142 may be any of the network entities shown in FIG. 1 (e.g., LCS client 130, LCS manager 140, positioning server 150, or PPG 160).

On the forward link, base station 112 transmits data, signaling, and pilot to the UEs within its coverage area. These various types of data are processed (e.g., encoded, modulated, filtered, amplified, quadrature modulated, and upconverted) by a modulator/transmitter (Mod/TMTR) 516 to generate a forward link modulated signal, which is transmitted via an antenna 518. At UE 120, an antenna 522 receives the forward link modulated signals from base station 112 and possibly other base stations and provides a receiver input signal to a receiver/demodulator (RCVR/Demod) 524. The receiver input signal may include received signals for base stations and possibly satellites. RCVR/Demod 524 processes the receiver input signal in a manner complementary to the processing performed by the transmitter(s) and provides various types of information that may be used for position determination. For example, RCVR/Demod 524 may provide the time of arrival of received signals (which may be used for position determination), decoded messages used for the call flows described above, assistance data from satellites, and so on. A processor 530 performs processing for UE 120. A memory unit 532 stores program codes and data for processor 530.

On the reverse link, UE 120 may transmit data, signaling, and pilot to base station 112. These various types of data are processed by a modulator/transmitter (Mod/TMTR) 534 to generate a reverse link modulated signal, which is transmitted via antenna 522. At base station 112, antenna 518 receives the reverse link modulated signal from UE 120 and provides a receiver input signal to a receiver/demodulator (RCVR/Demod) 520. RCVR/Demod 520 processes the receiver input signal in a manner complementary to the processing performed by the UEs and provides various types of information to a processor 510. Processor 510 performs processing for base station 112. A memory unit 512 stores program codes and data for processor 510. A communication (Comm) unit 514 allows base station 112 to exchange data with other network entities.

Within network entity 142, a communication unit 544 allows network entity 142 to communicate with other network entities. A processor 540 performs processing for network entity 142. A memory unit 542 stores program codes and data for processor 540. A database 546 stores information pertinent for network entity 142 (e.g., subscriber information, location information, GPS assistance data, and so on).

The method and apparatus described herein may be implemented by various means. For example, the method and apparatus may be implemented in hardware, software, or a combination thereof. For a hardware implementation, the units used to perform the processing described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the method may be implemented with modules (e.g., procedures, functions, and so on) that perform the functions described herein. The software codes may be stored in a memory unit (e.g., memory unit 532 or 542 in FIG. 5) and executed by a processor (e.g., processor 530 or 540). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of performing position determination of user equipment (UE) in a network, comprising:
   in the UE, receiving from the network an indication to perform a position fix of the UE;
   from the UE, sending to the network an acknowledgment to perform the position fix;
   in the UE, receiving from the network a pre-session command that indicates selected location-related data to be cleared from at least a portion of a memory in the UE containing the selected location-related data to reset said portion of the memory to a known state, and responsive thereto, clearing said selected location-related data at the UE by deleting the selected location-related data from said portion of the memory prior to performing the position fix for the UE; and
   performing a location session, including performing the position fix for the UE.

2. The method of claim 1, wherein the clearing the selected location-related data at the UE comprises identifying at least one type of location-related data associated with the command received from the network, wherein the received command is selected from among a plurality of clear commands, and wherein each clear command corresponds to a different set of at least one type of location-related data at the UE, and clearing the at least one type of location-related data at the UE associated with the received command.

3. The method of claim 1, wherein the clearing the selected location-related data at the UE comprises clearing at least one type of global positioning satellite (GPS) assistance data at the UE prior to performing the position fix.

4. The method of claim 1, wherein the clearing the selected location-related data at the UE comprises clearing all location-related data at the UE prior to performing the position fix.

5. The method of claim 1, wherein the clearing the selected location-related data at the UE comprises clearing a position estimate available at the UE prior to performing the position fix.

6. The method of claim 1, wherein the clearing the selected location-related data at the UE comprises clearing a cell-ID database at the UE prior to performing the position fix.

7. The method of claim 1, further comprising:
   retaining the location-related data at the UE if a clear command is not received from the network.

8. The method of claim 1, further comprising:
   receiving from the network the location-related data that has been cleared at the UE by the command received from the network.

9. The method of claim 3 wherein said GPS assistance data to be cleared includes at least one of time information, almanac, ephemeris, ionospheric information, UTC time offset, position estimate, and cell-ID database.

10. An apparatus comprising:
    a receiver operative to receive from a network an indication to perform a position fix for a user equipment (UE);
    a transmitter operative to send to the network an acknowledgment to perform the position fix;
    means for receiving from the network a pre-session command that indicates selected location-related data to be cleared from at least a portion of a memory in the UE containing the selected location-related data to reset said portion of the memory to a known state; and
    a processor operative to clear the selected location-related data at the UE prior to performing the position fix for the UE by deleting the selected location-related data from said portion of the memory, responsive to the pre-session command received from the network, and to perform a location session, including performing the position fix for the UE.

11. The apparatus of claim 10, wherein the processor is operative to identify at least one type of location-related data associated with the command received from the network and to clear the at least one type of location-related data at the UE associated with the received command, wherein the received command is selected from among a plurality of clear commands, and wherein each clear command corresponds to a different set of at least one type of location-related data at the UE.

12. The apparatus of claim 10, wherein the processor is operative to clear at least one type of global positioning satellite (GPS) assistance data at the UE prior to performing the position fix.

13. The apparatus of claim 12 wherein said GPS assistance data to be cleared includes at least one of time information, almanac, ephemeris, ionospheric information, UTC time offset, position estimate, and cell-ID database.

14. An apparatus in a user equipment (UE) comprising:
    means for receiving from a network an indication to perform a position fix for the UE;
    means for sending to the network an acknowledgment to perform the position fix;
    means for receiving from the network a pre-session command that indicates selected location-related data to be cleared from at least a portion of a memory in the UE containing the selected location-related data to reset said portion of the memory to a known state;

means, responsive to said pre-session command, for clearing the selected location-related data at the UE prior to performing the position fix for the UE by deleting the selected location-related data from said portion of the memory; and means for performing a location session including performing the position fix for the UE.

15. The apparatus of claim 14, wherein the means for clearing the selected location-related data at the UE means for identifying at least one type of location-related data associated with the command received from the network, wherein the received command is selected from among a plurality of clear commands, and wherein each clear command corresponds to a different set of at least one type of location-related data at the UE, and means for clearing the at least one type of location-related data at the UE associated with the received command.

16. The apparatus of claim 14, wherein the means for clearing the selected location-related data at the UE comprises means for clearing at least one type of global positioning satellite (GPS) assistance data at the UE prior to performing the position fix.

17. The apparatus of claim 16 wherein said GPS assistance data to be cleared includes at least one of time information, almanac, ephemeris, ionospheric information, UTC time offset, position estimate, and cell-ID database.

18. An article, comprising: a storage medium having stored thereon instructions that, if executed, enable a user equipment (UE) comprising a processor to:

receive from a network an indication to perform a position fix of the UE;

send to the network an acknowledgment to perform the position fix;

receive from the network a pre-session command that indicates selected location-related data to be cleared from at least a portion of a memory in the UE containing the selected location-related data to reset said portion of the memory to a known state, and responsive thereto, clear said selected location-related data at the UE prior to performing the position fix for the UE by deleting the selected location-related data from said portion of the memory; and perform a location session, including performing the position fix for the UE.

19. The article of claim 18, wherein the storage medium has stored thereon further instructions that, if executed, further enable the UE to:

clear the selected location-related data at the UE by identifying at least one type of location-related data associated with the command received from the network, wherein the received command is selected from among a plurality of clear commands, and wherein each clear command corresponds to a different set of at least one type of location-related data at the UE; and clear the at least one type of location-related data at the UE associated with the received command.

20. The article of claim 18, wherein the storage medium has stored thereon further instructions that, if executed, further enable the UE to clear the selected location-related data at the UE by clearing at least one type of global positioning satellite (GPS) assistance data at the UE prior to performing the position fix.

21. The article of claim 18, wherein the storage medium has stored thereon further instructions that, if executed, further enable the UE to clear the selected location-related data at the UE by clearing all location-related data at the UE prior to performing the position fix.

22. The article of claim 18, wherein the storage medium has stored thereon further instructions that, if executed, further enable the UE to clear the selected location-related data at the UE by clearing a position estimate available at the UE prior to performing the position fix.

23. The article of claim 18, wherein the storage medium has stored thereon further instructions that, if executed, further enable the UE to clear the selected location-related data at the UE by clearing a cell-ID database at the UE prior to performing the position fix.

24. The article of claim 18, wherein the storage medium has stored thereon further instructions that, if executed, further enable the UE to retain the location-related data at the UE if a clear command is not received from the network.

25. The article of claim 18, wherein the storage medium has stored thereon further instructions that, if executed, further enable the UE to receive from the network the location-related data that has been cleared at the UE by the command received from the network.

26. The article of claim 20 wherein said GPS assistance data to be cleared includes at least one of time information, almanac, ephemeris, ionospheric information, UTC time offset, position estimate, and cell-ID database.

* * * * *